United States Patent [19]

Mazaki et al.

[11] Patent Number: 5,456,867

[45] Date of Patent: Oct. 10, 1995

[54] VIEWING ANGLE COMPENSATOR FOR LIQUID CRYSTAL DISPLAY

[75] Inventors: Hitoshi Mazaki, Kawasaki; Takehiro Toyooka; Hiroyuki Itoh, both of Yokohama, all of Japan

[73] Assignee: Nippon Oil Company, Limited, Tokyo, Japan

[21] Appl. No.: 283,994

[22] Filed: Aug. 1, 1994

Related U.S. Application Data

[63] Continuation of Ser. No. 921,898, Jul. 29, 1992, abandoned.

[30] Foreign Application Priority Data

Jul. 29, 1991 [JP] Japan .................................. 3-276047
Aug. 22, 1991 [JP] Japan .................................. 3-233723

[51] Int. Cl.⁶ ............................................. G02F 1/1335
[52] U.S. Cl. .............................. 264/2.6; 428/1; 359/73
[58] Field of Search ..................... 428/1, 480; 359/73, 359/63–68; 264/2.6

[56] References Cited

U.S. PATENT DOCUMENTS

| | | | |
|---|---|---|---|
| 4,738,811 | 4/1988 | Hara et al. | 264/211.12 |
| 4,744,918 | 5/1988 | Heppke et al. | 252/299.61 |
| 4,793,691 | 12/1988 | Enomoto et al. | 428/68 |
| 4,828,758 | 5/1989 | Gillberg-LaForce et al. | 252/582 |
| 5,081,221 | 1/1992 | Watanabe | 428/1 |

FOREIGN PATENT DOCUMENTS

| | | |
|---|---|---|
| 244288 | 11/1987 | European Pat. Off. . |
| 292244 | 11/1988 | European Pat. Off. . |
| 62-238538 | 10/1987 | Japan . |

OTHER PUBLICATIONS

Meredith et al., Optical and Nonlinear Optical Characterization of Molecularly Doped Thermotropic Liquid Crystalline Polymers, *Macromolecules* 15, (Dec. 1982).

Jerphagnon et al., Maker Fringes, A Detailed Comparison of Theory and Experiment for Isotropic and Uniaxial Crystals, *Journ. of Applied Physics* 41, (Dec. 1970) pp. 1667–1681.

Chemical Abstracts, vol. 98 (Dec. 1983) p. 19, Abstract No. 98:161429K, Chiral Liquid Crystal Polymers.

*Primary Examiner*—Alexander S. Thomas
*Attorney, Agent, or Firm*—Scully, Scott, Murphy & Presser

[57] ABSTRACT

According to the present invention there is provided a viewing angle compensator for a liquid crystal display capable of diminishing the viewing angle dependency of the liquid crystal display.

The viewing angle compensator comprises a light transmitting substrate and a film of a specific liquid crystalline polyester, the liquid crystalline polyester taking in the state of liquid crystal a structure wherein a refractive index in the thickness direction is larger than a refractive index at least in one direction in a plane and assuming a glassy state at a temperature lower than the liquid crystal transition point of the polymer.

The viewing angle dependency of the liquid crystal display can be greatly diminished and thus the viewing angle compensator of the present invention contributes to the realization of high-grade displays and higher performance of a liquid crystal display unit.

5 Claims, 7 Drawing Sheets

VIEWING ANGLE COMPENSATOR FOR LIQUID CRYSTAL DISPLAY

This is a continuation of application Ser. No. 921,898, filed on Jul. 29, 1992, now abandoned.

BACKGROUND OF THE INVENTION

The present invention relates to a viewing angle compensator for a liquid crystal display capable of diminishing the viewing angle dependency of the liquid crystal display.

Liquid crystal display is occupying an important position in the display field, taking the place of the cathode-ray tube, because of such characteristic features as being driven at a low voltage, light weight and low cost. However, since the liquid crystal display adopts a method of displaying images by utilizing orientating behaviors of a liquid crystalline substance having an optical anisotropy, it inevitably involves the problem (hereinafter referred to as "viewing angle dependency") that the color tone of screen changes according to directions of seeing the panel. The viewing angle dependency becomes more conspicuous when a color compensating optical element such as a stretched film or a liquid crystal cell is mounted to the liquid crystal cell. For example, in the case of a lap-top type personal computer or a word processor display, utilizing a twisted nematic mode ("TN" hereinafter) or a super-twisted nematic mode ("STN" hereinafter), relatively good images are obtained when the screen is seen from the front, but when the screen is seen from a direction other than the front, the screen is colored or it becomes difficult to see images on the screen. Such viewing angle dependency of the display is not only undesirable to users but also is an obstacle to the realization of a larger screen which is required for a wall-mounted TV or the like. In the case of a large screen display, as long as the prior art is used, it is impossible to obtain clear images throughout the entire screen because the marginal portion comes to have a certain viewing angle even when the screen is seen from the front.

As means for diminishing such viewing angle dependency of the display, it has been suggested that the use of a film having a refractive index in the thickness direction larger than an intra-plane refractive index. [M. Akatuka et al.: Japan Display '89, 336 (1989)]. Actually, however, such a film is scarcely existent, and even when it is existent, the difference between the refractive index in the thickness direction and an intra-plane refractive index is 0.001 or so at most (Japanese Patent Laid Open No. 85519/1991), and thus an outstanding effect of remedying the viewing angle dependency has not been obtained yet. As a substance having a large refractive index anisotropy, a liquid crystalline substance is promising, but it has been considered that in the case of a low molecular liquid crystal, it is difficult to maintain a stable orientation, while in the case of a high molecular liquid crystal, it is impossible to obtain a uniform orientation.

Taking note of a liquid crystalline film having a large refractive index in the thickness direction in order to diminish the viewing angle dependency of a liquid crystal display, the present inventors have made extensive studies for obtaining a new liquid crystalline polymer which satisfies the said condition. As a result, the present inventors found out that films of a group of liquid crystalline polymers, including a ferroelectric and antiferroelectric liquid crystals proposed previously by us could take a structure having a large refractive index in the thickness direction. In this way we accomplished the present invention.

It is the object of the present invention to provide a compensator for a liquid crystal display, particularly a viewing angle compensator for a liquid crystal display using a liquid crystalline polyester film with orientation solidified.

SUMMARY OF THE INVENTION

The present invention resides in a viewing angle compensator for a liquid crystal display constituted by a film of a liquid crystalline polyester which in the state of liquid crystal takes a structure with a refractive index in the thickness direction being larger than a refractive index at least in one direction in a plane and assumes a glassy state at a temperature lower than the liquid crystal transition point thereof, the liquid crystalline polyester comprising structural units (A), (B) and, optionally, (C) which are represented by the following general formulae:

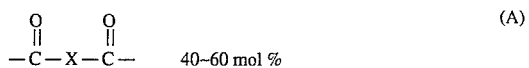   (A)

where X represents at least one structural unit selected from the group consisting of:

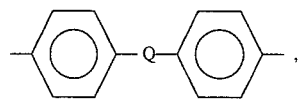

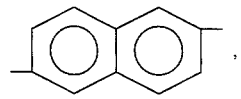

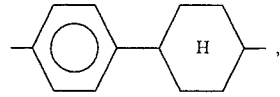

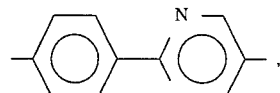

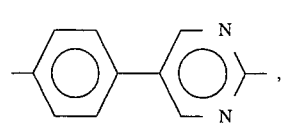

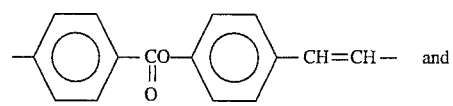

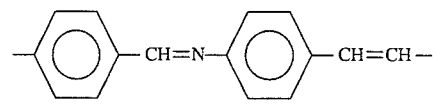

where Q represents a mere bond,

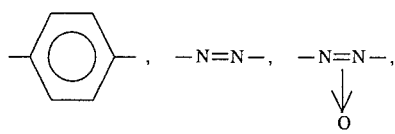

-continued

−CH=CH−, −CH=N−, 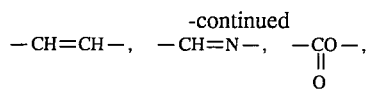

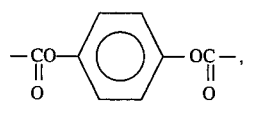

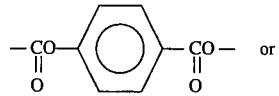 or

, (B) —O—Y—O— 1~60 mol % where Y represents a divalent aliphatic group having 3 to 12 carbon atoms, including at least one asymmetric carbon atom.

(C) —O—Z—O— 0~59 mol % where Z represents a straight-chain or branched, divalent aliphatic group having 2 to 18 carbon atoms The present invention is also concerned with the above viewing angle compensator for a liquid crystal display wherein the said liquid crystalline polyester exhibits a homeotropic orientation in the state of liquid crystal. Further, the present invention resides in a viewing angle compensator for a liquid crystal display using a film produced by heat-treating a liquid crystalline polyester comprising the structural units (A), (B) and, if desired, (C) of the foregoing general formulae on a substrate at a temperature higher than the glass transition point of the liquid crystalline polyester and then cooling to a temperature lower than the said glass transition point to solidify a structure wherein a refractive index in the thickness direction is larger than a refractive index at least in one direction in a plane.

Figure 1:
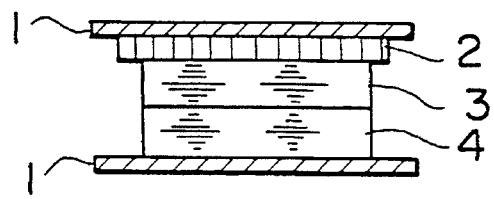
FIG. 1 is a sectional view showing the construction of a two-layer cell color-compensated type STN display and a viewing angle compensator both used in Examples 4 and 15.

The reference numerals and lines used in the drawings are as follows:
1 . . . polarizing plate
2 . . . viewing angle compensator
3 . . . color compensating cell
4 . . . liquid crystal display cell
5 . . . STN display cell
6 . . . TN cell
Solid line . . . represents the presence of a compensator
Dotted line . . . represents the absence of a compensator

DESCRIPTION OF THE PREFERRED EMBODIMENTS

The present invention will be described in more detail hereinunder.

First, the constituents of the liquid crystalline polyester used in the present invention will be described. The structural unit [unit (A)] represented by the following general formula is an essential component which functions as a mesogen for developing liquid crystallinity and which is derived from a dicarboxylic acid (HOOC—X—COOH) or a derivative thereof (e.g. a dialkyl ester or an acid chloride). Unit (A) is present in a proportion of 40–60 mol %, preferably 45–55 mol %, more preferably, substantially 50 mol %, in the polymer:

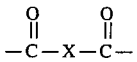

The X in the above formula is exemplified as follows:

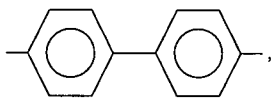

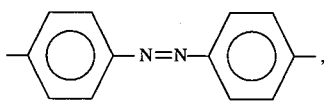

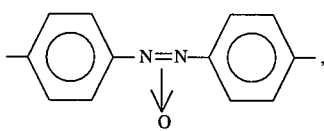

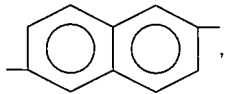

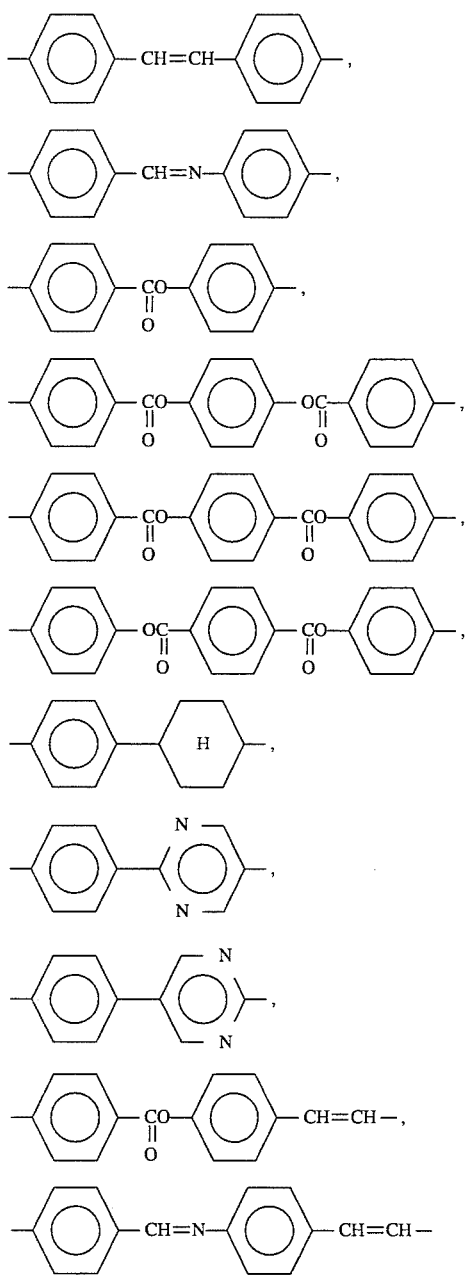

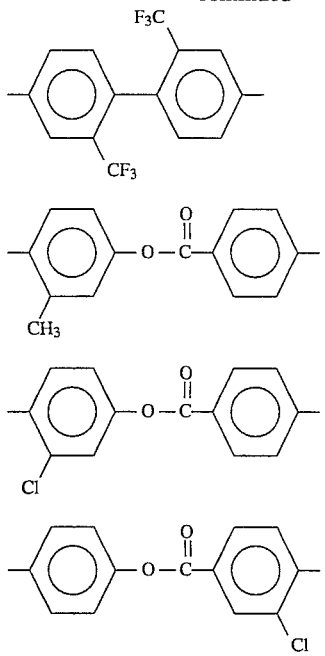

One or more, preferably one or two, of those shown above are incorporated in the polyester molecule. In this structural unit, at least one, preferably one or two, of hydrogen atoms on the aromatic rings may be substituted with $C_4$ or less alkyl, alkoxy, halogen or halogenated alkyl. As examples of such a substituted structural unit there are mentioned:

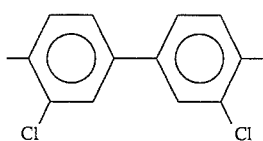

The following are particularly preferred as X in the above formulae:

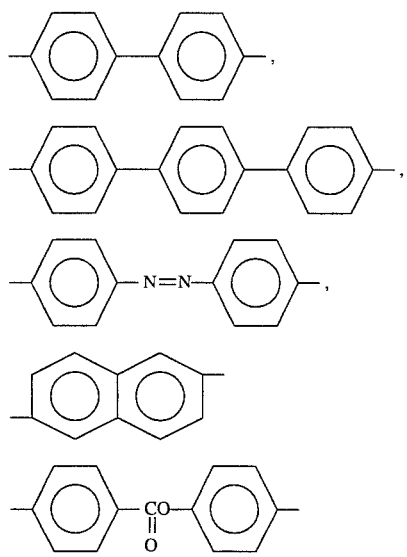

The structural unit [unit (B)] represented by the general formula —O—Y—O— is an essential component for permitting the polyester used in the present invention to exhibit liquid crystallinity and permitting the state of liquid crystal thereof to be solidified, and it contains at least one asymmetric carbon atom.

Unit (B) is derived from a corresponding diol (HO—Y—OH) or a derivative thereof (e.g. a diacetoxy compound).

The Y group in the formula is a divalent aliphatic group having 3 to 12 carbon atoms and containing at least one asymmetric carbon atom. As an example there is mentioned an alkylene group having 2 to 12, preferably 2 to 6, carbon atoms on the main chain, with hydrogen atoms being partially substituted by an alkyl group having 1 to 4 carbon atoms, provided the total number of carbon atoms of Y group is 3 to 12, or by a halogen atom (in this case, main chain carbon atoms are 3 to 12), and containing an asymmetric carbon atom. The following are more concrete examples:

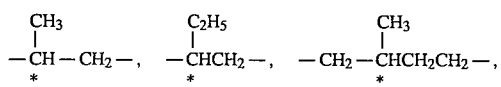

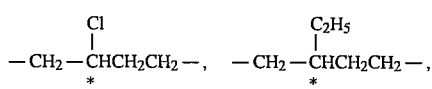

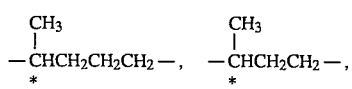

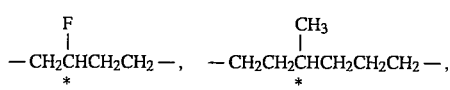

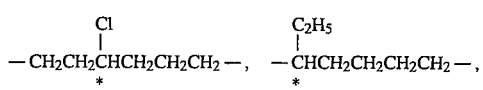

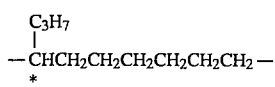

(The mark * represents an asymmetric carbon atom.)

Particularly preferred are:

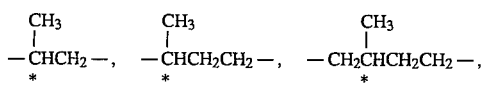

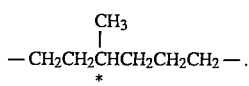

If the number of carbon atoms of Y is smaller than 2 or larger than 13, there will not be attained a satisfactory orientation. The diol to be used may be an R-isomer or an S-isomer or may be a mixture of the two. In the case of a mixture of the two, the difference in content between both isomers may be optional, that is, it may be in the range of 0 to 100%. Generally, though depending also on the film thickness, when the said difference is not zero, the film after the solidification of orientation easily takes a spiral structure, while when the difference is zero, that is, in the case of a racemic mixture, a spiral structure will not be formed. There sometimes occurs a difference in refractive index in the three-dimensional direction after the solidification of orientation, depending on whether a spiral structure is present or not or the degree of a spiral pitch. Optical purity of the structural unit having an asymmetric carbon atoms can serve as one effective means for controlling the refractive index in the three-dimensional direction.

The structural unit [unit (C)] represented by the general formula —O—Z—O is an important component for controlling the transition temperature, the range of the liquid crystal temperature and viscosity when the polyester used in the present invention forms a liquid crystal phase. The kind and content thereof can be selected suitably according to physical properties of a desired polymer. The number of carbon atoms contained in the Z group is 2 to 18. The proportion of unit (C) is preferably in the range of 0 to 59 mol %, more preferably 5 to 50 mol %. Theoretically, it is desirable for the total amount of units (B) and (C) to be approximately an equimolar amount with respect to unit (A). The unit (C) is derived from a corresponding diol or a derivative thereof (e.g. diacetoxy derivative). As typical examples of Z there are mentioned alkylene groups represented by the general formula —(CH$_2$)—$_n$ where n is an integer of 2 to 18, as well as substituted groups obtained by substituting the hydrogen atoms of the said alkylene groups partially with an alkyl group of 1 to 4 carbon atoms.

The Z group may be classified into two groups. One is those wherein the number of carbon atoms in the main chain portion of the Z group is an odd number, preferably an odd number of 3 to 11, more preferably 3 to 9 and another is those wherein the number of carbon atoms in the main chain portion of the Z group is an even number, i.e. an even number of 2 to 18, preferably 2 to 12. The following are more concrete examples of the odd number main chain carbon atoms-containing Z group:

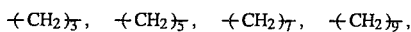

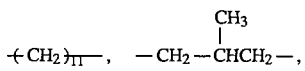

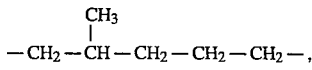

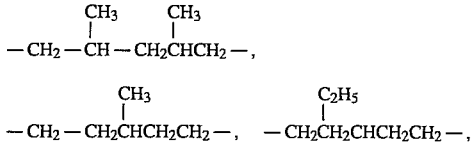

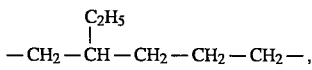

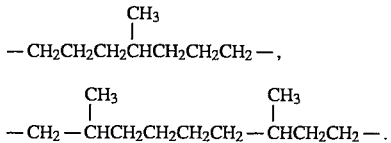

Particularly preferred are:

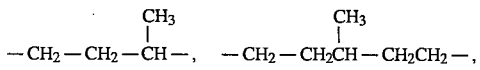

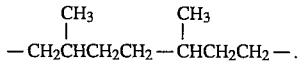

The following are more concrete examples of the even number main chain carbon atoms-containing Z group:

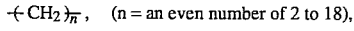

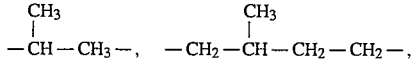

-continued $$-\overset{\underset{|}{CH_3}}{CH}-CH_2-CH_2-CH_2-,$$

$$-\overset{\underset{|}{CH_3}}{CH}-CH_2-CH_2-\overset{\underset{|}{CH_3}}{CH}-,$$

$$-CH_2-\overset{\underset{|}{C_2H_5}}{CH}-CH_2-CH_2-,$$

$$-CH_2-CH_2-\overset{\underset{|}{CH_3}}{CH}-CH_2-CH_2-CH_2-,$$

$$-CH_2-\overset{\underset{|}{CH_3}}{CH}-CH_2-\overset{\underset{|}{CH_3}}{CH}-CH_2-\overset{\underset{|}{CH_3}}{CH}-,$$

$$-CH_2-\overset{\underset{|}{CH_3}}{CH}-CH_2-\overset{\underset{|}{CH_3}}{CH}-CH_2-\overset{\underset{|}{CH_3}}{CH}-CH_2-\overset{\underset{|}{CH_3}}{CH}-.$$

Particularly preferred are:

$+CH_2\!\!\rightarrow_{\overline{n}}$, (n = an even number of 2 to 12), $$-CH_2-\overset{\underset{|}{CH_3}}{CH}-CH_2-CH_2-,$$

$$-\overset{\underset{|}{CH_3}}{CH}-CH_2-CH_2-CH_2-,$$

$$-CH_2-CH_2-\overset{\underset{|}{CH_3}}{CH}-CH_2-CH_2-CH_2-.$$

How to prepare the liquid crystalline polyester used in the present invention is not specially limited. There may be used a melt polymerization method or an acid chloride method using dichloride of a corresponding dicarboxylic acid (ClOC—X—COCl), which are known as polyester preparing methods. For example, in the case of a melt polycondensation method, the polyester can be prepared by polymerizing at a high temperature a dialkyl ester of a corresponding dicarboxylic acid (e.g. MeOOC—X—COOMe), an optically active, corresponding diol (HO—Y—OH) and another diol (HO—Z—OH). Adjustment of the molecular weight can be done easily by controlling the feed composition and the polymerization time. For accelerating the polymerization reaction there may be used alkali metal salts which are known polyester preparing catalysts, or such metallic salts as Fe, Mn, Cd, Mg, Ba, Ti, Zn, Pb, Co, Sb and Sn salts, each alone or in combination. Further, a phosphorus compound may be used as a decomposition inhibitor.

The acid chloride method permits the adoption of milder conditions for the polymerization. For example, the desired polymer can be obtained easily by dissolving a corresponding acid chloride (ClOC—X—COCl), an optically active, corresponding diol (HO—Y—OH) and another diol (HO—Z—OH) in predetermined amounts in a solvent, followed by heating in the presence of an acid acceptor, e.g. pyridine.

The molecular weight of the liquid crystalline polyester used in the present invention is preferably in the range of 0.01 to 5.0 dl/g, more preferably 0.05 to 3.0 dl/g, in terms of an inherent viscosity determined in phenol/tetrachloroethane (60/40 weight ratio) at 30° C. In the case where the inherent viscosity is lower than 0.01 dl/g, the strength after solidifying is apt to become lower, and if the inherent viscosity exceeds 5.0 dl/g, a satisfactory orientation may not be obtained because of too high viscosity in the state of liquid crystal.

The compensator of the present invention is produced by heat-treating on a self-supporting substrate or a vertical alignment film a liquid crystalline polyester which takes a uniform, monodomain structure with a refractive index in the thickness direction being larger than a refractive index at least in one direction in a plane and which permits this oriented state to be solidified easily, and solidifying the orientation in the state of liquid crystal. As a typical example of an orientation behavior having a three-dimensional refractive index distribution required for the compensator of the present invention there is mentioned a homeotropic orientation. The homeotropic orientation as referred to herein includes an inclined (or pretilted) structure at a certain angle (e.g. 45° or less) from the normal direction of the substrate, in addition to a structure wherein molecular major axes are oriented perpendicularly to the substrate. A liquid crystalline polyester capable of maintaining its orientation in the state of liquid crystal also at room temperature or thereabouts stably is required to have the following property as an essential condition. When viewed in terms of a phase series of liquid crystal, it is important that there be no crystal phase in a lower temperature region than the crystal phase region. If such crystal phase is present, an inevitable passage through it at the time of cooling for solidification results in destruction of the orientation once obtained, thus leading to unsatisfactory transparency and viewing angle compensating effect. In fabricating the compensator of the present invention, therefore, it is absolutely necessary to use a liquid crystalline polyester having glass phase in a lower temperature region than the crystal phase region. Although the liquid crystal phase of the liquid crystalline polyester is not specially limited, there usually is mentioned smectic phase.

A typical construction example of the compensator of the present invention is a two-layer structure comprising a light transmitting substrate and a liquid crystalline polyester film formed thereon. As examples of the light transmitting substrate used there are mentioned light transmitting plastic film, plastic sheet and polarizing film. As glass there is used, for example, soda glass, silica-coated soda glass, or borosilicate glass. As to a plastic substrate, it is preferable for it being optically isotropic. For example, there may be used, polymethyl methacrylate, polystyrene, polycarbonate, polyether sulfone, polyphenylene sulfide, amorphous polyolefin, triacetyl cellulose, or epoxy resin. Above all, polymethyl methacrylate, polycarbonate, polyether sulfone, amorphous polyolefin and triacetyl cellulose are preferred. As the substrate there also may be used a light transmitting substrate which has been subjected to an orientating treatment, for example, a substrate having formed thereon a vertical orienting agent layer such as a layer of a silanizing agent, lecithin or chromium complex. Also, when the number of carbon atoms in the main chain portion of Z group in the above mentioned unit (C) is an odd number, in addition to the above exemplified substrate, a substrate having an alignment film known in this field such as a rubbing-treated polyimide film or an obliquely vapor-deposited film of silicon oxide may be used. A film of the liquid crystalline polyester is formed on such light transmitting substrate which has not been subjected or has been subjected to an orientating treatment, to produce a viewing angle compensator.

The liquid crystalline polyester is applied onto the substrate in the state of a solution or in a melted state. A solution of the polymer is obtained by dissolving at a predetermined concentration of the polymer in a predetermined solvent. In the case of using a composition comprising two or more kinds of polymers, for example in the case of solution mixing, the components are dissolved in a solvent at predetermined proportions to prepare a solution of a predetermined concentration. The solvent to be used differs depending on the kind of polymers used, but usually there may be used any of ketones such as acetone, methyl ethyl ketone and cyclohexanone, ethers such as tetrahydrofuran and dioxane, halogenated hydrocarbons such as chloroform, dichloroethane, tetrachloroethane, trichloroethylene, tetrachloroethylene and o-dichlorobenzene, mixed solvents thereof with phenol, as well as dimethylformamide, dimethylacetamide, dimethyl sulfoxide and N-methylpyrrolidone. The concentration of the solution greatly differs depending on the viscosity of polymer used, but usually it is in the range of 5% to 50%, preferably 8% to 30%. The solution is then applied onto a light transmitting substrate such as a light transmitting glass sheet, plastic sheet or plastic film which has not been subjected or has been subjected to an orientating treatment. As the polymer solution coating method there may be adopted spin coating method, roll coating method, printing method, curtain coating method, or dipping/pulling up method. After the coating, the solvent is removed by drying and then heat treatment is performed at a predetermined temperature for a predetermined time to complete a liquid crystal orientation of monodomain. As to the heat treatment temperature, the higher the temperature, the better, because it is possible to lower the polymer viscosity. Generally, the polymer has an isotropic phase in a higher temperature region than the liquid crystal phase, so even if heat treatment is made in this temperature region, there will not be obtained orientation. Thus, it is desirable that in accordance with the characteristics of polymer used there are performed heat treatment at a temperature above the glass transition point of the polymer and below the transition point thereof to an isotropic phase. Usually, the range of 40° C. to 300° C. is preferable. and the range of 50° C. to 250° C. is more preferable. The heat treatment time required for attaining a satisfactory orientation differs depending on the composition and molecular weight of polymer used, but preferably it is in the range of 5 seconds to 120 minutes, more preferably 10 seconds to 60 minutes. If the said time is shorter than 5 seconds, the orientation obtained will be unsatisfactory, and if it is longer than 120 minutes, the transparency of the resulting compensator may be deteriorated. The same state of orientation can also be obtained by applying the polymer in a melted state onto the substrate which has not been subjected or has been subjected to the orientation treatment, followed by heat treatment. By performing the treatments described above using the liquid crystalline polyester in the present invention there can be obtained in the state of liquid crystal a structure wherein a refractive index in the thickness direction is larger than a refractive index at least in one direction in a plane.

By subsequent cooling, the oriented state thus obtained can be solidified without impairing the orientation. Generally, in the case of using a polymer having a crystal phase in a lower temperature region than the liquid crystal phase region, the orientation in the state of liquid crystal will be destroyed by cooling. According to the method of the present invention, such phenomenon does not occur because there is used a polymer having glass phase in a region lower than the temperature region which exhibits crystal phase, and it is possible to completely solidify the structure in which the refractive index in the thickness direction is larger than that at least in one direction in a plane.

The cooling rate is not specially limited. The cooling may be done slowly, or for enhancing the production efficiency there may be performed a forced cooling such as air cooling or water cooling. The film thickness after the solidification is preferably in the range of 0.1 µm to 50 µm, more preferably 0.5 µm to 40 µm.

In order for the viewing angle compensator of the present invention to exhibit a satisfactory visual angle compensating effect, it is necessary to effect matching of the refractive index in the three-dimensional direction of the layer (compensating layer) of the liquid crystalline polymer film according to a liquid crystal display cell. The control of the refractive index in the three-dimensional direction of the compensating layer can be attained by suitably selecting the kind of polymer or by mixing two or more kinds of polymers, provided in both cases it is important that the refractive index in the thickness direction be larger than that at least in one direction in a plane. The difference between the refractive index in the thickness direction and the refractive index at least in one direction in a plane which is smaller than the former is usually not less than 0.01, preferably not less than 0.05. At this time, the control of the compensating layer thickness must also be done, but it is not so strict if only the film thickness can be reproduced within an error range of usually ±10%, preferably ±5%. with such a degree of error, there will be no visible difference with respect to the viewing angle compensating effect.

The viewing angle compensator thus obtained may be used as it is, or a protective layer of a transparent plastic material may be formed on the surface of the compensator for the protection of the surface. Or it may be used in an integrated form with another optical element such as a polarizing plate for example.

The liquid crystalline polymer film formed in the manner described above exhibits a viewing angle compensating effect for a liquid crystal display having a twist angle in the range of 70° to 300°. For example, it can remedy the viewing angle dependency of TN display or STN display. The position where the viewing angle compensator is to be mounted is not specially limited if only it is between upper and lower polarizing plates of a liquid crystal display. For example, it may be between a lower polarizing plate and a liquid crystal display cell or between the display cell and an upper polarizing plate. When a color compensator is used above the liquid crystal display cell, a satisfactory viewing angle compensating effect is obtained in all of the cases where viewing angle compensator mounting positions are between the lower polarizing plate and the liquid crystal display cell, between the cell and the color compensator, and between the color compensator and the upper polarizing plate. The compensator may be a single sheet, or two or more sheets thereof may be disposed between the upper and lower polarizing plates. The visual angle compensator of the present invention can exhibit the same effect also in a liquid crystal display having a color filter for color display.

Thus, the viewing angle compensator produced by the present invention can diminish the viewing angle dependency peculiar to a liquid crystal display, thereby not only contributes to upgrading a liquid crystal display but also is considered contributable to the realization of a large area of a liquid crystal display. Thus, the viewing angle compensator according to the present invention is of extremely great industrial value.

(EXAMPLES)

The following examples are given to further illustrate the present invention, but it is to be understood that the invention is not limited thereto. The following analyzing methods were used in those examples.

13

(1) Determination of Polymer Composition

Polymer was dissolved in deuterated chloroform or deuterated trifluoroacetic acid and the polymer composition was determined using $^1$H-NMR of 400 MHz (JNM-GX400, a product of Japan Electron Optics Laboratory Co., Ltd.).

(2) Determination of Inherent Viscosity

Determined in a mixed phenol/tetrachloroethane solvent (60/40 weight ratio) at 30° C. using a Ubbelohde's viscometer.

(3) Determination of Liquid Crystal Phase Series

Determined by measurement using DSC (DuPont 990 Thermal Analyzer) and observation using an optical microscope (BH2 Polarizing Microscope, a product of Olympus Optical Co., Ltd.).

(4) Determining Stereostructure of Liquid Crystalline Polymer Film after Solidifying of Orientation A refractive index in the three-dimensional direction was measured using Abbe's refractometer (Type-4, a product of Atago K.K.), and a structure was determined by observation using a conoscope attached to an optical microscope.

Example 1

Using 100 mM (millimol) of diethyl 4,4'-biphenyldicarboxylate, 50 mM of (R)-1,3-butanediol and 50 mM of 1,5-pentanediol, a melt polycondensation was allowed to take place with stirring in a current of nitrogen gas while raising the temperature stepwise like 180° C., 2 hours, 200° C., 1 hour, 220° C., 1 hour, and 240° C., 1 hour. Lastly, the pressure of the system was reduced and reaction was allowed to proceed at 250° C. for 15 minutes to prepare a polymer. The polymer was then dissolved in tetrachloroethane and re-precipitation was performed using methanol to afford 27.0 g of a purified polymer. The polymer had an inherent viscosity of 0.12, the only chiral smectic C phase as a liquid crystal phase and a glass transition point of 20° C.

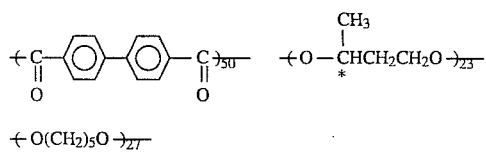

Using the polyester prepared above, a 15 wt % solution thereof in tetrachloroethane was prepared. The polymer solution was then applied onto a borosilicate glass plate 1.1 mm thick having a size of 10 cm×10 cm by a screen printing method, then dried, heat-treated at 140° C. for 10 minutes and thereafter cooled to fabricate a viewing angle compensator having a compensating layer thickness of 3.5 μm. The compensator was completely transparent, and as a result of observation using a conoscope, the compensator was found to have a positive crystal structure of homeotropic orientation.

Example 2

The polymer solution described in Example 1 was cast onto a high refraction glass plate (a product of Hoya Glass Works, Ltd., refractive index: 1.84), followed by drying and heat treatment in the same way as in Example 1. As a result, there was obtained a transparent film 3.0 μm in thickness having a refractive index of 1.57 in all of directions parallel to the substrate and a refractive index of 1.74 in the thickness direction.

14

Example 3

The polymer solution prepared in Example 1 was applied onto a high refraction glass base having a rubbing-treated polyimide film, then dried and heat-treated at 140° C. for 10 minutes to obtain a transparent film having a thickness of 3.4 μm. As a result of conoscope observation, the film was found to have a positive crystal structure of homeotropic orientation. In all of directions parallel to the substrate, the refractive index was 1.57, and in the thickness direction, it was 1.74.

Example 4

The viewing angle compensator obtained in Example 1 was disposed on a two-layer cell type color-compensated STN display in such a manner that the compensating layer was located on the upper side, as shown in FIG. 1.

As a result of having checked a compensating effect of this test display, it turned out that the lowering in contrast with increase of the viewing angle became gentle as compared with that in the absence of the viewing angle compensator, as shown in FIG. 4. (In Figs., the term visual angle means viewing angle.)

Example 5

The visual angle compensator obtained in Example 1 was disposed on an upper side of a TN display cell and a comparison was made with the case of not using the viewing angle compensator with respect to the viewing angle dependency. The results obtained are as illustrated in FIG. 5.

Example 6

Using 100 mM of diethyl 4,4'-biphenyldicarboxylate, 50 mM of (R)-1,3-butanediol and 50 mM of 1,5-pentanediol, a polymer was prepared and purified and a solution prepared in the same way as in Example 1. The polymer had an inherent viscosity of 0.13, the only smectic C phase as a liquid crystal phase and a glass transition point of 21° C.

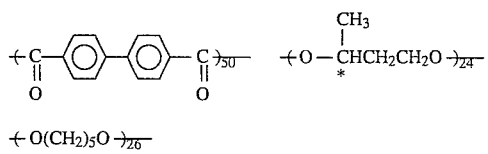

The polymer solution was applied onto a high refraction glass base having a rubbing-treated polyimide film, then dried and heat-treated at 140° C. for 10 minutes to obtain a transparent film having a thickness of 3.4 μm. In conoscope observation, isogyre was not observed. Refractive indices were 1.60 in a direction parallel to the rubbing direction, 1.54 in a direction perpendicular thereto and 1.74 in the thickness direction.

Example 7

The polymers prepared in Examples 1 and 6 were mixed together in weight ratios of 75:25, 50:50 and 25:75 to prepare 15 wt % solutions in tetrachloroethane. The solutions were each applied onto a glass substrate by a spin coating method and then heat-treated for 20 minutes under drying at 130° C. The resulting polymer films were 4 μm or so in thickness, and as a result of conoscope observation, all of them were found to have a positive crystal structure of homeotropic orientation.

Example 8

Using 100 mM of diethyl 4,4'-biphenyldicarboxylate, 40 mM of (R)-2-chlorobutanediol having an optical purity of 5% and 60 mM of 2-methylnonanediol, a polymer (inherent viscosity: 0.21, Tg=30° C.) of the following formula was prepared and purified and a solution prepared in the same manner as in Example 1. The polymer was then melted at 230° C. and applied onto a substrate heated to 200° C. on a hot plate. Thereafter, the temperature of the hot plate was reduced to 130° C., then the coated surface was covered with a raw glass plate, and the glass plate was slightly shifted right and left several times to impart a shear to the polymer. After standing at this temperature for 15 minutes, the sample was removed from the hot plate and cooled with air, whereby there could be obtained a transparent liquid crystal film sandwiched in between two glass plates. In conoscope observation of this film, isogyre was not observed. The same operations were performed using a high refraction glass and

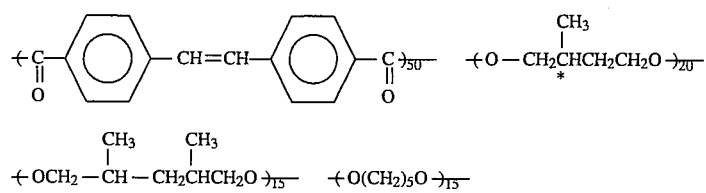

refractive indices were measured, which were found to be 1.59 in a direction parallel to the sheared direction, 1.55 in a direction perpendicular thereto and 1.72 in the thickness direction.

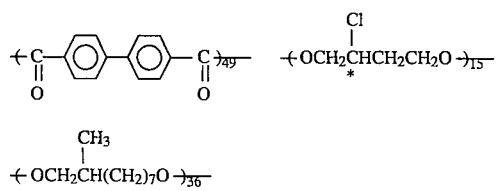

Example 9

A glass plate which had been washed with concentrated sulfuric acid was dipped in a solution of octadecyltriethoxysilane in toluene to form a vertical alignment film on the glass plate. The polymer of the following formula was dissolved in a mixed tetrachloroethane/phenol (weight ratio 4/6) solvent so as to provide a total polymer concentration of 28 wt %. Then, the glass plate was dipped in this polymer solution and pulled up for coating of the solution thereon, then allowed to stand at room temperature for 5 hours, then dried at 100° C. for 2 hours and heat-treated at 180° C. for 30 minutes. A transparent film having a thickness of about 8 μm was obtained, which was found to have a positive crystal structure of homeotropic orientation.

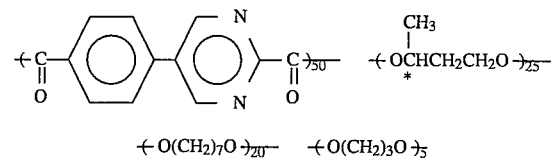

Example 10

An 8 wt % solution of the polymer (inherent viscosity: 0.10) of the following formula in trichloroethylene was applied onto a 50 μm thick polyethylene terephthalate film by means of a roll coater, then dried at 60° C. for 20 seconds, heat-treated at 200° C. for 20 seconds and then cooled to solidify with cold air to obtain a compensator having a compensating layer thickness of 3.2 μm. Upon conoscope observation, the compensating layer was found to have a positive crystal structure of homeotropic orientation.

Example 11

A 10 wt % solution of the polymer (inherent viscosity: 0.12) of the following formula in tetrachloroethane was prepared and applied onto a raw glass plate 1.1 mm thick having a size of 10 cm×10 cm by a spin coating method, then dried, heat-treated at 140° C. for 30 minutes and cooled to obtain a transparent compensating layer having a thickness of 1.0 μm. As a result of conoscope observation of this layer, isogyre was seen at the center of the viewing field, and the layer was found to have a positive crystallinity by insertion of a phase retarder therein.

Figure 2:
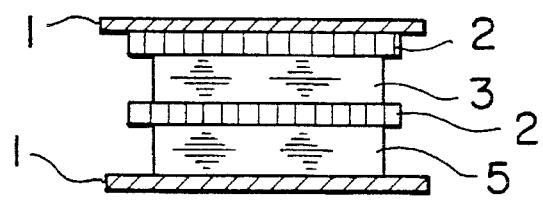
FIG. 2 is a sectional view showing the construction of a two-layer cell color-compensated type STN display and a viewing angle compensator both used in Examples 11 and 21.

Another compensator of about the same thickness as above was fabricated and the two viewing angle compensators were incorporated in an STN display in such a construction as shown in FIG. 2. As a result, there was obtained such a satisfactory viewing angle compensating effect as shown in FIG. 6.

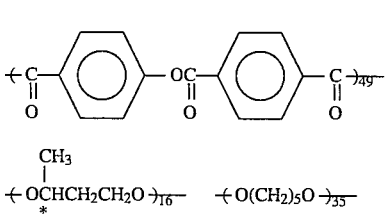

Example 12

Using the polymer solution prepared in Example 11, two viewing angle compensators were fabricated in the same way as in Example 11 except that only the number of revolutions in the spin coating operation was changed. The respective compensating layers were each 0.6 μm thick. These compensators were incorporated in a TN display in such a construction as illustrated in FIG. 6. As a result, there was no longer any change in color tone of the display caused by changes of the viewing angle, and a viewing angle compensating effect could be confirmed.

Example 13

Using 100 mM of diethyl 4,4'-biphenyldicarboxylate, 50 mM of (R)-2-methylbutanediol and 50 mM of 1,8-octanediol, a melt polycondensation was allowed to take place with stirring in a current of nitrogen gas while raising the temperature stepwise like 180° C., 1 hour and 200° C., 1 hour. Lastly, the pressure of the system was reduced and reaction was allowed to proceed at 180° C. for 30 minutes to prepare a polymer. The polymer was then dissolved in tetrachloroethane and thereafter reprecipitation was performed using methanol to afford 31.4 g of a purified polymer. This polymer proved to have an inherent viscosity of 0.18, a smectic A phase (not higher than 200° C.) and a chiral smectic C phase (not higher than 170° C.) in a lower temperature region, as liquid crystal phases, and a glass transition point of 25° C. (See the following formula.)

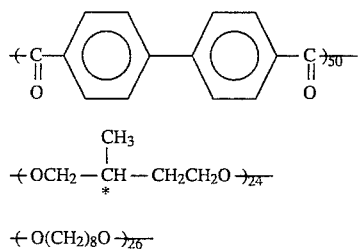

There was prepared a 20 wt % solution of this polyester in tetrachloroethane, and the solution was applied onto a borosilicate glass plate 1.1 mm thick having a size of 10 cm×10 cm by a screen printing method, then dried. Next, the dried sample was put into an oven and heat-treated at 180° C. for 10 minutes. Then, the temperature was reduced to 150° C. over a period of 10 minutes, and after holding at this temperature for 10 minutes, the sample was cooled to obtain a viewing angle compensator having a compensating layer thickness of 3.5 μm. The compensator was completely transparent, and as a result of conoscope observation, it proved to have a positive crystal structure of homeotropic orientation.

Example 14

The polymer solution prepared in Example 13 was cast over a high refraction glass plate (refractive index: 1.84, a product of Hoya Glass Works, Ltd.), then dried and heat-treated in the same way as in Example 1. The refractive index of the resulting transparent film having a thickness of 3.0 μm was 1.55 in all of directions parallel to the substrate and the refractive index thereof in the thickness direction was 1.72.

Example 15

The viewing angle compensator obtained in Example 13 was disposed on a two-layer cell type color-compensated STN display in such a manner that the compensating layer was located on the upper side, as shown in FIG. 1.

Figure 7A:
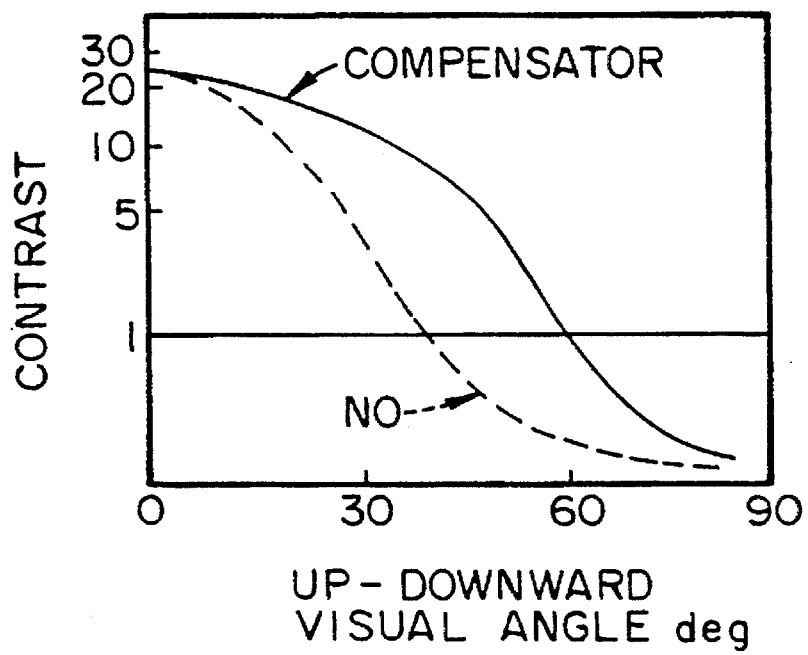
FIG. 7(a)–(b) shows the results obtained in the Example 15, representing a viewing angle—contrast relation observed when the STN test display is seen from above, below, right and left.
Figure 7B:
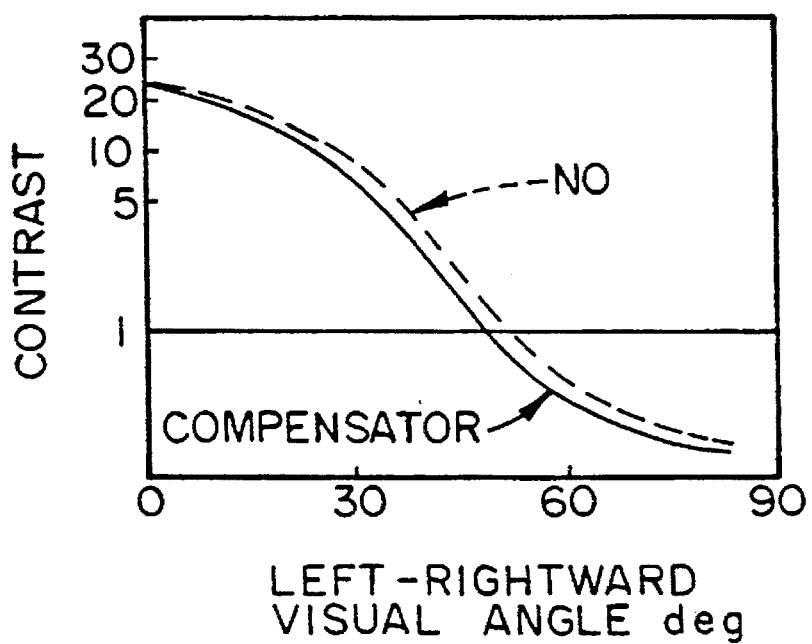
Figure 8A:
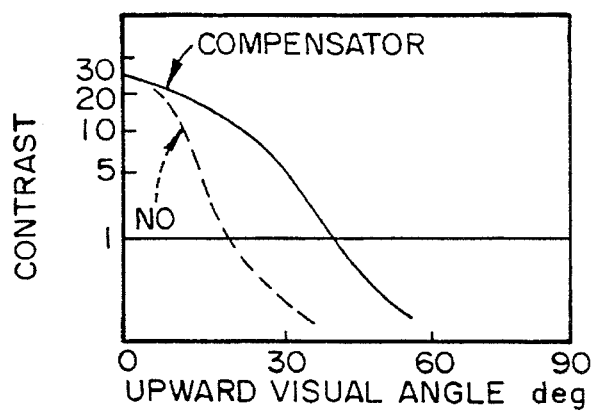
FIG. 8(a–d) shows the results obtained in Example 16, representing viewing angle—contrast relation observed when a TN test display is seen from above, below, right and left.
Figure 8B:
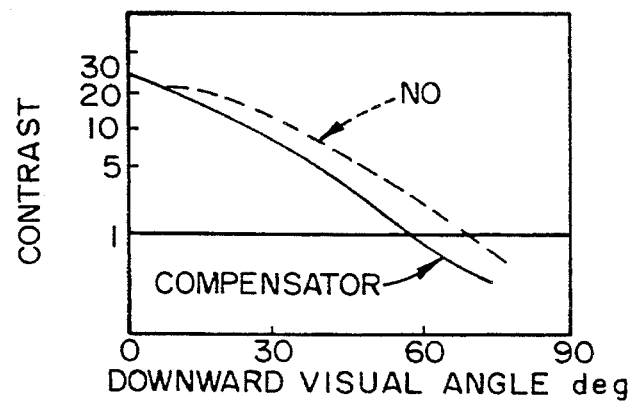
Figure 8C:
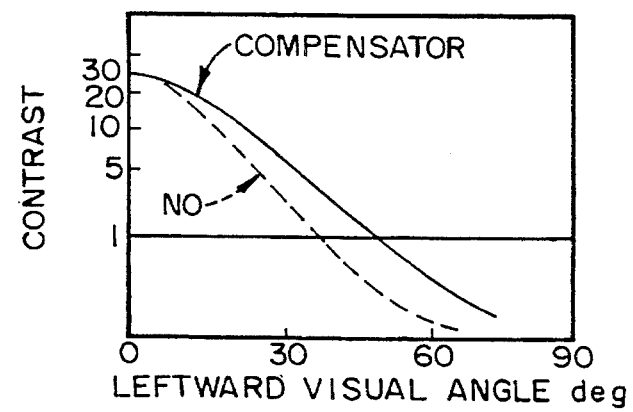
Figure 8D:
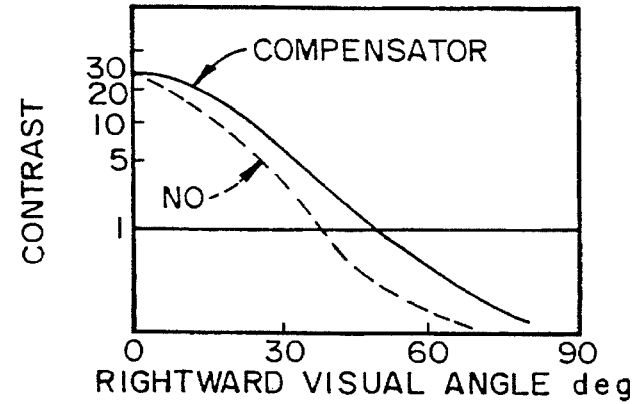
Figure 9A:
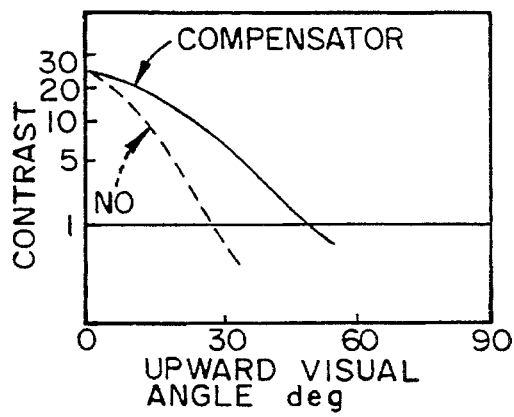
FIG. 9(a–d) shows the results obtained in Example 21, representing viewing angle—contrast relation observed when the STN test display is seen from above, below, left and right.
Figure 9B:
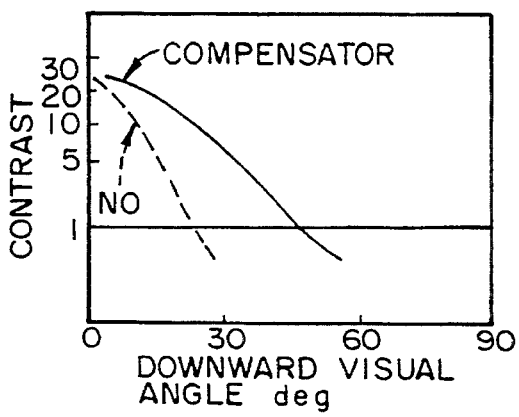
Figure 9C:
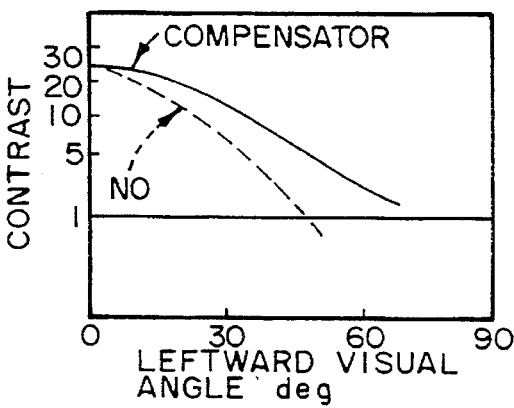
Figure 9D:
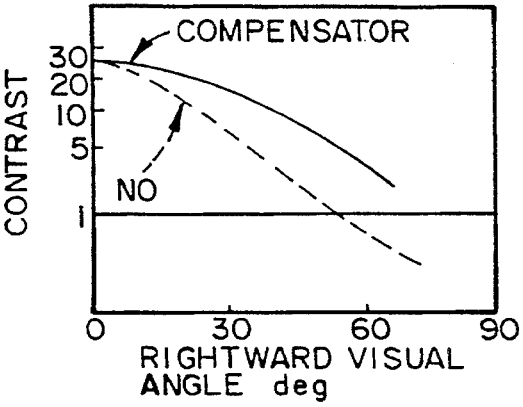

As a result of having checked a compensating effect of this test display, it turned out that the lowering in contrast with increase of the viewing angle became gentle as compared with that in the absence of the viewing angle compensator, as shown in FIG. 7.

Example 16

The viewing angle compensator obtained in Example 13 was disposed on an upper side of a TN display cell and a comparison was made with the case of not using the viewing angle compensator with respect to the visual angle dependency. The results obtained are as shown in FIG. 8.

Example 17

A polymer (the following formula) was prepared under the same reaction conditions as in Example 13 except that a racemic mixture of 2-methylbutanediol was used in place of the optically active 2-methylbutanediol used in Example 13.

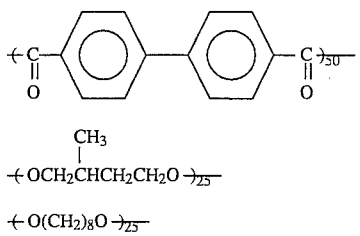

The polymer thus prepared and the polymer prepared in Example 13 were mixed together in weight ratios of 75:25, 50:50 and 25:75 to prepare 20 wt % solutions in tetrachloroethane. Using these solutions, there were performed coating, drying, heat treatment and cooling under the same conditions as in Example 13. In each of the mixing ratios there was obtained a transparent film having a thickness of about 3.5 μm. As a result of conoscope observation, all of the films obtained were found to have a positive crystal structure of homeotropic orientation.

Example 18

Using 60 mM of diethyl 4,4'-biphenyldicarboxylate, 20 mM of (R)-2-chlorobutanediol, 20 mM of 1,4-dimethylbutanediol and 20 mM of ethylene glycol, a polymer was prepared and purified under the same conditions as in Example 13. The polymer thus obtained (the following formula) was found to have an inherent viscosity of 0.13, a smectic A phase (not higher than 215° C.) and a smectic C phase (not higher than 190° C.) as liquid crystal phases, and a glass transition point of 21° C.

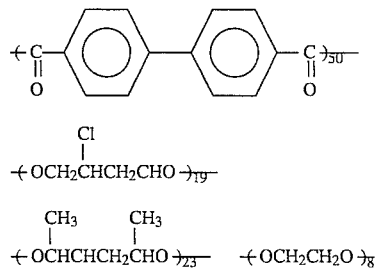

The polymer was melted at 230° C. and applied onto a glass base heated to 200° C. on a hot plate, then the coated surface was covered with a raw glass plate, and the upper glass plate was slightly shifted right and left several times to impart a shear to the polymer. As a result, the polymer film became completely transparent. The temperature of the hot plate was reduced to room temperature (25° C.) at a rate of 5° C./min, whereby there could be obtained a transparent, solidified, liquid crystal film sandwiched in between two sheets of glass. As a result of conoscope observation of this film isogyre was not observed. The same operations as above were performed using a high refraction glass, followed by measurement of refractive indices, which were found to be 1.61 in a direction parallel to the sheared direction, 1.55 in a direction perpendicular thereto and 1.73 in the thickness direction.

Example 19

A glass plate which had been washed with concentrated sulfuric acid was dipped in a solution of octadecyltriethoxysilane in toluene to form a vertical alignment film on the glass plate. The polymer of formula

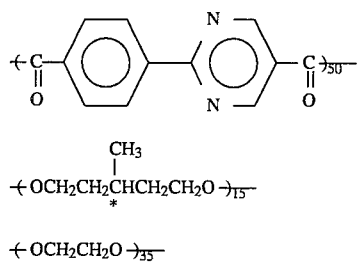

was dissolved in a mixed tetrachloroethane/phenol (weight ratio 4/6) solvent to prepare a 24 wt % polymer solution. The vertical alignment base was dipped in the polymer solution and pulled up for coating, thereafter allowed to stand at room temperature for 5 hours, then dried at 100° C. for 2 hours and heat-treated at 180° C. for 30 minutes. The base was then immersed in 25° C. water for rapid cooling, whereby there was obtained a transparent film about 8 μm thick. As a result of conoscope observation, the film was found to have a positive crystal structure of homeotropic orientation.

Example 20

The polymer of formula

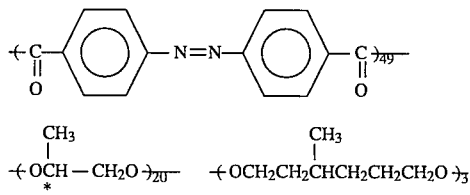

was prepared, which proved to have an inherent viscosity of 0.10 and a phase series of isotropic phase→smectic A→chiral smectic C→glass at a reduced temperature. Then, an 18 wt % solution of the polymer in tetrachloroethane was applied onto a 100 μm thick polyether sulfone film (50 cm wide by 10 m long) by means of a roll coater and then dried. The same polyether sulfone film was laminated to the coated surface and a shear stress was imparted to the coated polymer by passing the laminate through two rollers heated to 150° C., followed by cooling to room temperature, to obtain a transparent polymer film sandwiched in between the two polyether sulfone films. As a result of conoscope observation of the polymer film, the film was found to have a positive structure of homeotropic orientation.

Example 21

A 10 wt % solution of the polymer (inherent viscosity: 0.13) of the following formula in trichloroethylene was prepared and applied onto a raw glass plate 1.1 mm thick having a size of 10 cm×10 cm by a spin coating method, then dried, heat-treated at 180° C. for 30 minutes on a hot plate and lowered the temperature of the plate at a rate of 5° C./min. to 120° C. and maintained at this temperature for 10 min. and cooled to obtain a transparent compensating layer having a thickness of 0.95 μm. As a result of conoscope observation of this layer, isogyre was seen at the center of the visual field, and the layer was found to have a positive crystallinity by insertion of a sensitive color plate therein.

Another compensator of about the same thickness as above was fabricated and the two visual angle compensators were incorporated in an STN display in such a construction as shown in FIG. 2. As a result, there was obtained such a satisfactory viewing angle compensating effect as shown in FIG. 9.

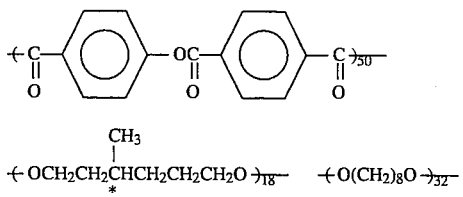

Example 22

Figure 3:
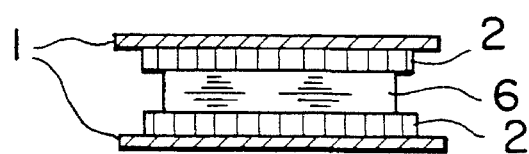
FIG. 3 is a sectional view showing the construction of a TN display and a viewing angle compensator both used in Examples 12 and 22.
Figure 4A:
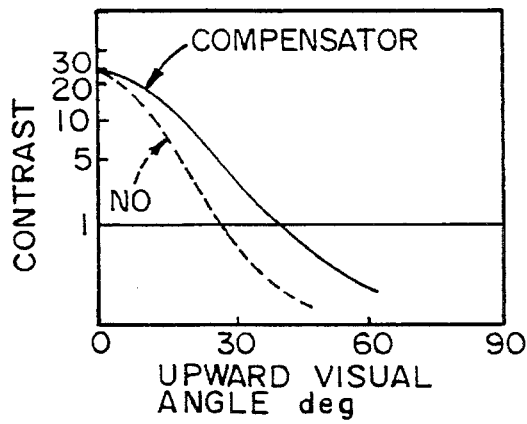
FIG. 4(a–d) shows the results obtained in the Example 4, representing a viewing angle—contrast relation observed when the STN test display is seen from above, below, right and left.
Figure 4B:
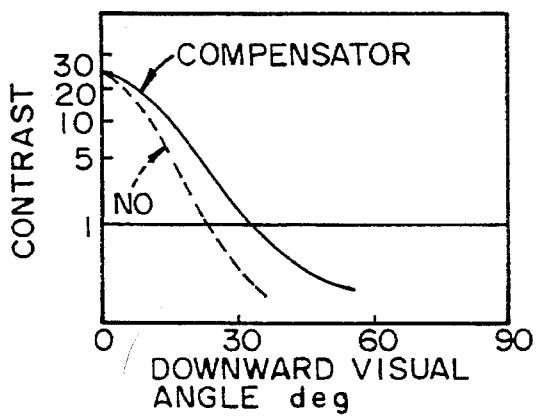
Figure 4C:
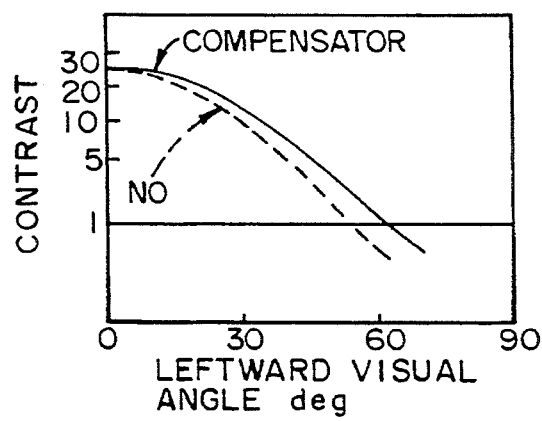
Figure 4D:
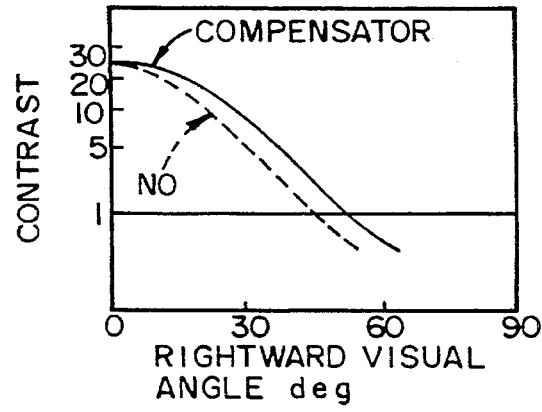
Figure 5A:
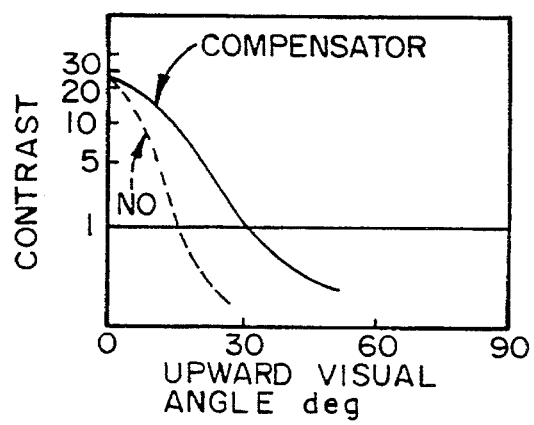
FIG. 5(a–d) shows the results obtained in Example 5, representing viewing angle—contrast relation observed when a TN test display is seen from above, below, right and left.
Figure 5B:
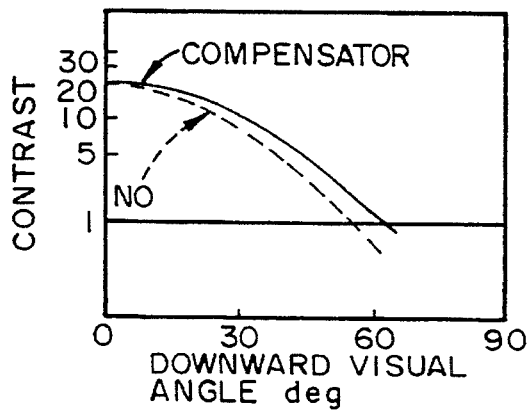
Figure 5C:
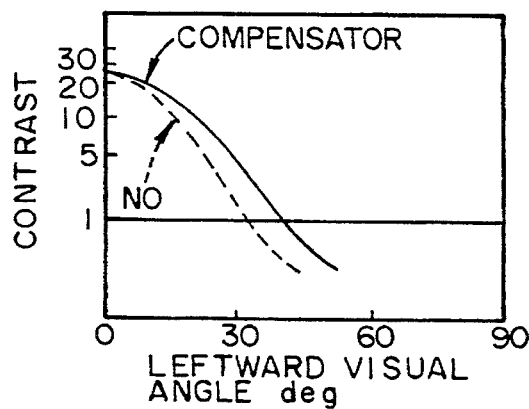
Figure 5D:
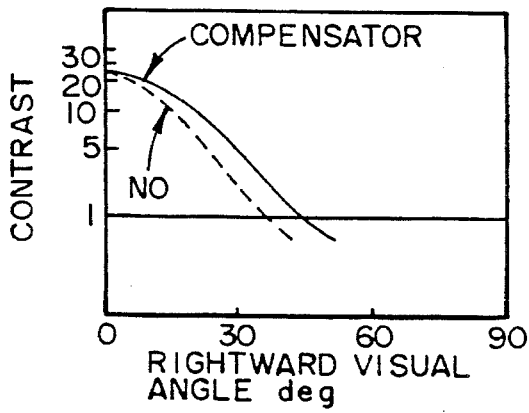
Figure 6A:
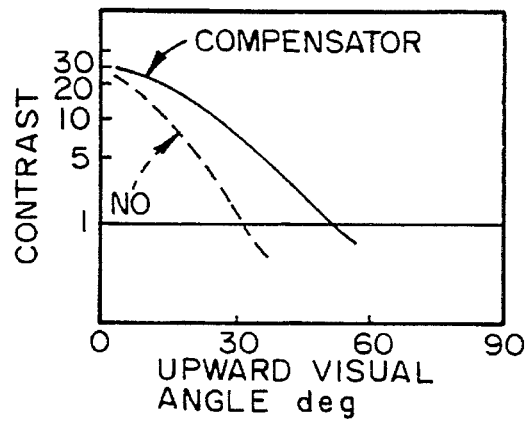
FIG. 6(a–d) shows the results obtained in the Example 11, representing a viewing angle—contrast relation observed when the STN test display is seen from above, below, right and left.
Figure 6B:
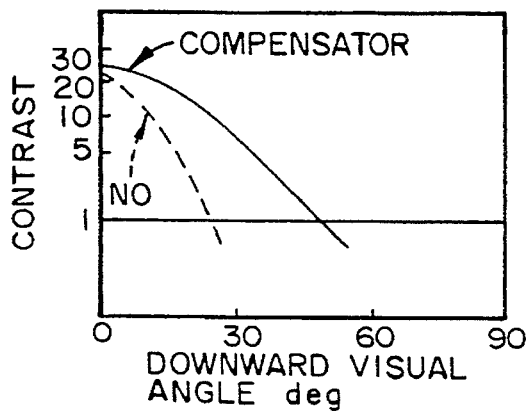
Figure 6C:
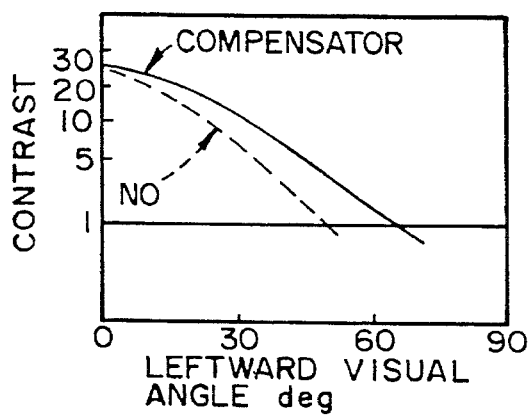
Figure 6D:
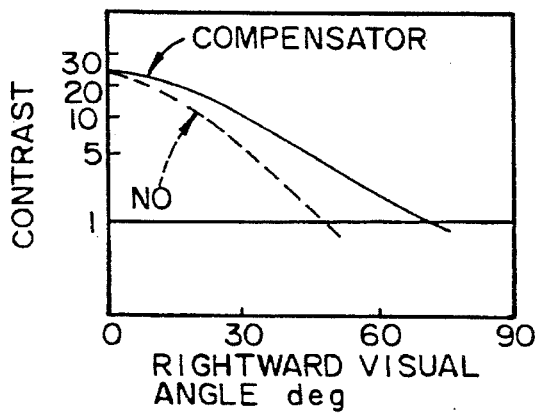

Using the polymer solution prepared in Example 21, two viewing angle compensators were fabricated in the same way as in Example 21 except that only the number of revolutions in the spin coating operation was changed. The respective compensating layers were each 0.5 μm thick. These compensators were incorporated in a TN display in such a construction as illustrated in FIG. 3. As a result, there was no longer any change in color tone of the display caused by changes of the viewing angle, and a viewing angle compensating effect could be confirmed.

[Effect of the Invention]

The viewing angle compensator of the present invention comprises a film of a liquid crystalline polyester having a solidified structure wherein a refractive index in the thickness direction is larger than a refractive index at least in one direction in a plane. With visual angle compensator of the invention, the visual angle dependency which is one serious problem involved in the liquid crystal display can be greatly remedied. As a result, there can be attained a great contribution to a high-grade display of a liquid crystal display unit and the attainment of higher performance. Thus, the visual angle compensator of the invention is of extremely high industrial value.

What is claimed is:

1. a method for diminishing the viewing angle dependency of a liquid crystal display comprising:
   (a) providing a viewing angle compensator comprising a light transmitting substrate and a film of a liquid crystalline polyester, said liquid crystalline polyester comprising structural units (A), (B) and, optionally, (C) which are represented by the following general formulae, said liquid crystalline polyester exhibiting a homeotropic orientation in the liquid crystal state, having a structure wherein the refractive index in the thickness direction is larger than the refractive index in at least one of the other directions located in the plane of the polymer and assuming a glassy state at a temperature lower than the liquid crystal transition point of the polymer:

$$-\overset{O}{\underset{\|}{C}}-X-\overset{O}{\underset{\|}{C}}- \quad \text{40–60 mol \%} \quad (A)$$

where X represents at least one structural unit selected from the group consisting of:

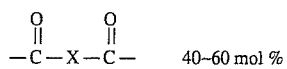

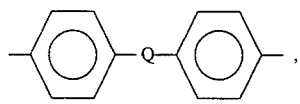

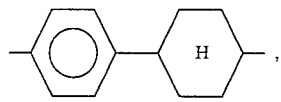

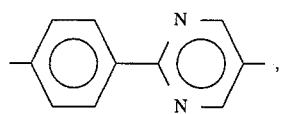

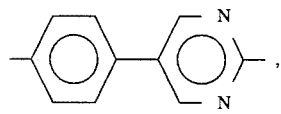

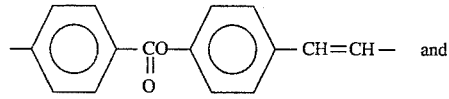 and

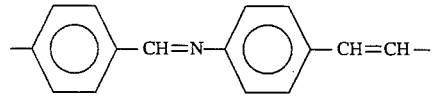

where Q represents a mere bond,

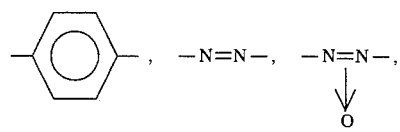

-continued
—CH=CH—, —CH=N—, —CO—,

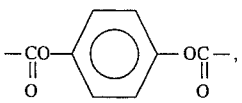

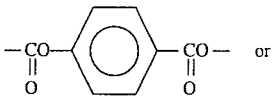 or

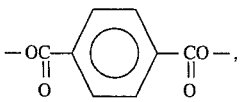

(B) —O—Y—O— 1–60 mol % where Y represents a divalent aliphatic group having 3 to 12 carbon atoms, containing at least one asymmetric carbon atom (C) —O—Z—O 0–59 mol % where Z represents a straight-chain or branched, divalent aliphatic group having 2 to 18 carbon atoms; and (B) positioning said compensator and a liquid crystal display cell between upper and lower polarizing plates, the combination of the compensator, the cell, and the upper and lower polarizing plates constituting the liquid crystal display.

2. The method according to claim 1, wherein the carbon number of Z is 3 to 12 and the carbon number of the main chain of Z is an odd number.

3. The method according to claim 1, wherein the carbon number of the main chain of Z is an even number.

4. The method according to claim 1, wherein said film is produced by heat-treating the liquid crystalline polyester on a substrate at a temperature higher than the glass transition point of the liquid crystalline polyester and then cooling to a temperature lower than said glass transition point to solidify the structure wherein the refractive index in the thickness direction is larger than the refractive index in at least one of the other directions in the plane of the polymer.

5. The method according to claim 1, wherein the liquid crystalline polyester exhibits said homeotropic orientation such that molecular major axes are oriented perpendicular to the substrate or inclined at an angle of 45° or less from the normal direction of the substrate.

* * * * *